United States Patent [19]

Ishitani et al.

[11] Patent Number: 4,632,403
[45] Date of Patent: Dec. 30, 1986

[54] STERN TUBE SEAL DEVICE PROVIDING A SEAL ABOUT A ROTATABLE SHAFT

[75] Inventors: Kenichiro Ishitani; Takashi Unseki, both of Tokyo; Saburo Amiboshi; Eiichi Kawamura, both of Saitama, all of Japan

[73] Assignees: Mitsubishi Jukogyo Kabushiki Kaisha; Eagle Industry Co., Ltd., both of Tokyo, Japan

[21] Appl. No.: 701,978

[22] Filed: Feb. 15, 1985

Related U.S. Application Data

[62] Division of Ser. No. 593,331, Mar. 26, 1984, Pat. No. 4,534,569.

[30] Foreign Application Priority Data

Sep. 27, 1983 [JP] Japan .................... 58-148206[U]
Sep. 27, 1983 [JP] Japan .................... 58-148207[U]

[51] Int. Cl.$^4$ .................... F16J 15/40; F16J 15/48
[52] U.S. Cl. .................... 277/27; 277/34.3; 277/59; 277/75; 277/173; 440/112
[58] Field of Search .................... 277/3, 27, 24, 34, 34.3, 277/34.6, 58, 59, 63, 65, 70, 71, 72 R, 72 FM, 75, 76, 173; 440/112

[56] References Cited

U.S. PATENT DOCUMENTS

| | | | |
|---|---|---|---|
| 3,121,570 | 2/1964 | Gilbert | 277/34.3 |
| 3,474,734 | 10/1969 | Stogner | 277/59 X |
| 3,578,342 | 5/1971 | Satterthwaite | 277/34 X |
| 3,625,523 | 12/1971 | Gardner | 440/112 X |
| 3,726,531 | 4/1973 | Pagan et al. | 440/112 X |
| 3,854,732 | 12/1974 | Franz et al. | 277/58 |
| 3,934,952 | 1/1976 | Gardner | 440/112 X |
| 4,395,141 | 7/1983 | Pietsch et al. | 440/112 X |

FOREIGN PATENT DOCUMENTS

| | | | |
|---|---|---|---|
| 3143866 | 5/1983 | Fed. Rep. of Germany | 440/112 |
| 53-1748 | 1/1978 | Japan | 440/112 |
| 197172 | 7/1965 | Sweden | 277/34 |
| 1182611 | 2/1970 | United Kingdom | 440/112 |

*Primary Examiner*—Robert S. Ward
*Attorney, Agent, or Firm*—Jordan and Hamburg

[57] ABSTRACT

A stern tube seal device providing a seal about a rotatable shaft includes an annular case member arranged about the outer periphery of a shaft, a gap between the annular case member and the shaft sealed by a plurality of lip seals, a floating ring seal or a pressure type hollow ring is arranged in the middle of the lip seal, and pressure fluid is charged into the rear portion of the floating ring seal or into the pressure type hollow ring to enhance the sealing effect by the pressure of the fluid.

8 Claims, 4 Drawing Figures

STERN TUBE SEAL DEVICE PROVIDING A SEAL ABOUT A ROTATABLE SHAFT

This is a division of application Ser. No. 593,331, filed Mar. 26, 1984, now U.S. Pat. No. 4,534,569.

BACKGROUND OF THE INVENTION

The present invention relates to a stern tube seal device which provides a seal about a rotatable shaft.

A stern tube seal device heretofore known includes a plurality of lip seals fixed to the inner periphery of of an opening in an annular case member arranged at the outer periphery of a shaft. The lip seal located externally (on the sea water side) is arranged to face towards the outside of the ship (sea water), and the lip seal located internally (on the machine side) is arranged to face towards the inside of the ship (lubricating oil). Leaking of sea water into the ship and leaking of lubricating oil outside the ship are prevented by sealing and sliding rotation of the shaft with respect to these lip seals. According to the above-described prior art device, the aforesaid external lip seal receives all the sea water pressure and the sliding load thereof with the shaft increases thereby resulting in early wearing. In addition, a second seal is not present with respect to leakage of lubricating oil and the leaked oil is not recovered, thus resulting in a danger in that the lubricating oil will flow outside the ship to contaminate the sea.

SUMMARY OF THE INVENTION

In view of the problems noted above, it is an object of the present invention to provide a stern tube seal device which is intended to enhance the sealing performance with respect to sea water and long-period durability and to prevent contamination of the sea resulting from leaking of lubricating oil outside the ship.

To achieve the above-described object, a stern tube seal device in accordance with the present invention is designed so that an annular recess portion is formed in the inner periphery of an opening in a case member positioned intermediate the plurality of lip seals. A floating ring seal or a pressure type hollow ring which forms a secondary seal with respect to both sea water and lubricating oil is disposed within the annular recess portion, and pressure fluid is charged into the rear portion of the floating ring seal or into the pressure type hollow ring.

While the present invention has been briefly described, the present invention and other objects and novel features thereof will become completely apparent from reading of the following detailed description in connection with embodiments shown in the accompanying drawings. However, the drawings show the embodiments merely for the purpose of understanding the present invention and the scope of the present invention is not limited thereby.

DESCRIPTION OF THE PREFERRED EMBODIMENTS

Figure 1:
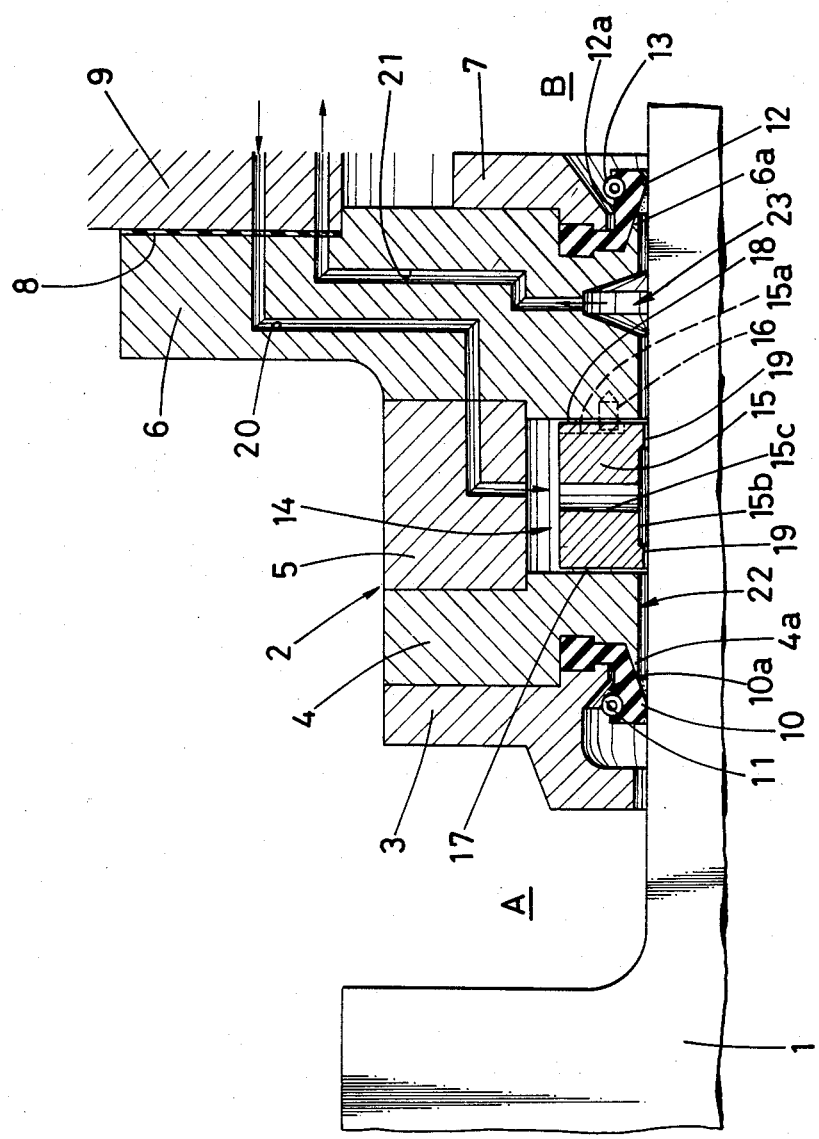
FIG. 1 is a sectional view taken along a diametrical cutting plane of a stern tube seal device in accordance with a first embodiment.

First, the first embodiment will be described with reference to FIG. 1.

In this figure, reference numeral 1 designates a shaft (including a sleeve slipped externally on the shaft) to the left-hand of which is mounted a screw (not shown). A casing means or case member 2 comprising first to fifth members 3, 4, 5, 6 and 7 is arranged on the outer periphery of the shaft 1 and fixed to a ship body 9 through packing 8. Reference numeral 10 designates an outer lip seal means or lip seal which is located at the inner periphery of an opening of the case member 2 and held between the first case member 3 and the second case member 4, the outer lip seal having a pressure receiving surface 10a, which is fitted with a fastening ring 11, arranged opposite to the sea water A. A back-up ring portion 4a for controlling operation of the lip seal 10 is provided at the rear of the second case member 4 with respect to the lip seal 10. Reference numeral 12 designates an inner lip seal means or lip seal held between the fourth case member 6 and the fifth case member 7, the inner lip seal having a pressure receiving surface 12a, which is fitted with a fastening ring 13, directed towards the lubricating oil B which is opposite to the outer lip seal 10. A back-up ring portion 6a with respect to the lip seal 12 is provided in the inner periphery of the fourth case member 6. The inside diameter of the third case member 5 which forms part of the case member 2, is made greater than that of the other four members 2, 4, 6 and 7, particularly the second and fourth case members 4 and 6, and an annular recess portion 14 is formed in the inner periphery of the third case member 5, the annular recess portion 14 being provided therein with a ring seal means or a floating ring seal 15. This floating ring seal 15 is such that a knock-pin 16 projecting from the fourth case member 6 engages a cut 15a formed in one end thereof to be stopped with respect to the case member 2 and both ends and an inner peripheral surface thereof are slightly distanced from the ends of the second and fourth case members 4 and 6 and the peripheral surface of the shaft 1 to form fine clearances 17, 18 and 19. The floating ring seal 15 is formed at its inner peripheral surface with an annular groove 15b and provided with the required number of through-holes 15c which extend through the inner and outer peripheral surfaces. Reference numeral 20 designates a feed line for pressure fluid in communication with the annular recess portion 14 partitioned by the floating ring seal 15 from the side of the ship body, which line extends through the third and fourth case members 5 and 6 to feed pressure fluid into the annular recess portion 14 from a fluid feed device (not shown) disposed within the ship. Reference numeral 21 designates a leaked liquid recovery line formed separately from the pressure fluid feed line 20, which recovery line is open to a space between the floating ring seal 15 and the internal lip seal 12 to recover leaked liquid which enters the space into the ship by means of a pump or the like (not shown).

Figure 2:
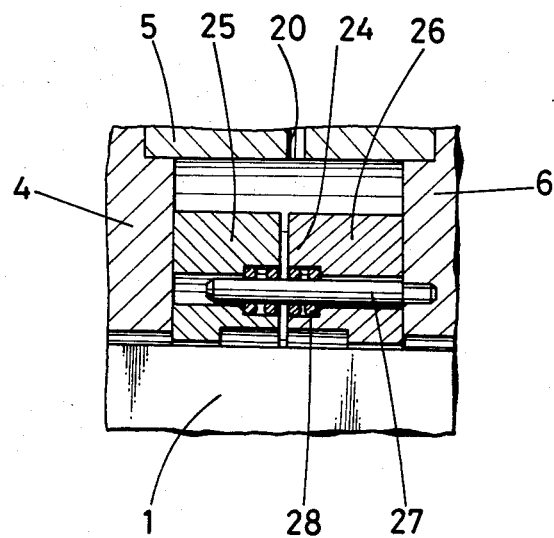
FIG. 2 is a sectional view showing an essential part of a stern tube seal device in accordance with a second embodiment.

In the stern tube seal device constructed as described above, when pressure fluid is fed into the annular recess portion 14 from the pressure fluid feed line 20, the annular recess portion 14 and annular groove 15b of the floating ring seal 15 in communication with the recess portion 14 through the through-hole 15c are filled with pressure fluid, and the pressure fluid passes through the clearances 17, 18 and 19 and gradually flows into spaces 22 and 23. Pressure fluid flowing into the space 22 between the external lip seal 10 and floating ring seal 15 is stored in the space 22 so as to act as back pressure with respect to the external lip seal 10 to lower the sliding load between the lip seal 10 and the peripheral surface of the shaft 1 and to prevent entry of sea water. In this case, it is considered that the pressure fluid might flow outside the ship depending on the pressure, and therefore, it is desirable to select and use pressure fluid which poses no problem in terms of contamination of the sea, most preferably, air or the like. On the other hand, pressure fluid flowing into the space between the internal lip seal 12 and the floating ring seal 15 is recovered into the ship from the leaked liquid recovery line 21 together with lubricating oil B leaked out of the internal lip seal 12, if any. In this manner, the floating ring seal 15 is able to sufficiently perform a function as a secondary seal with respect to the lip seals 10 and 12 as far as pressure fluid is being fed. Even if feeding of pressure fluid is stopped for some reason, the floating ring seal 15 functions as a secondary seal of a limited leaking type to maintain the sealing effect to some extent in cooperation with the recovery mechanism by the leaked liquid recovery line 21. Accordingly, in accordance with the seal device constructed as described above, the external lip seal 10 is pressed at the rear surface by the pressure fluid to lower the sliding load between the lip seal 10 and the peripheral surface of the shaft 1 to enhance the durability of the lip seal 10, which has been heretofore worn materially, to positively seal both sea water A and lubricating oil B and to recover the lubricating oil B into the ship through the leaked liquid recovery line 21, thus removing a fear of contamination of the sea. Next, FIG. 2 shows an essential part of a second embodiment. That is, the floating ring seal 15 comprises a double type seal 24 whose rear surfaces are opposed. Both seal members 24 and 26 are stopped for rotation by a common knock-pin 27, and the required number of springs 28 are interposed between both the seal members 25 and 26.

Figure 3:
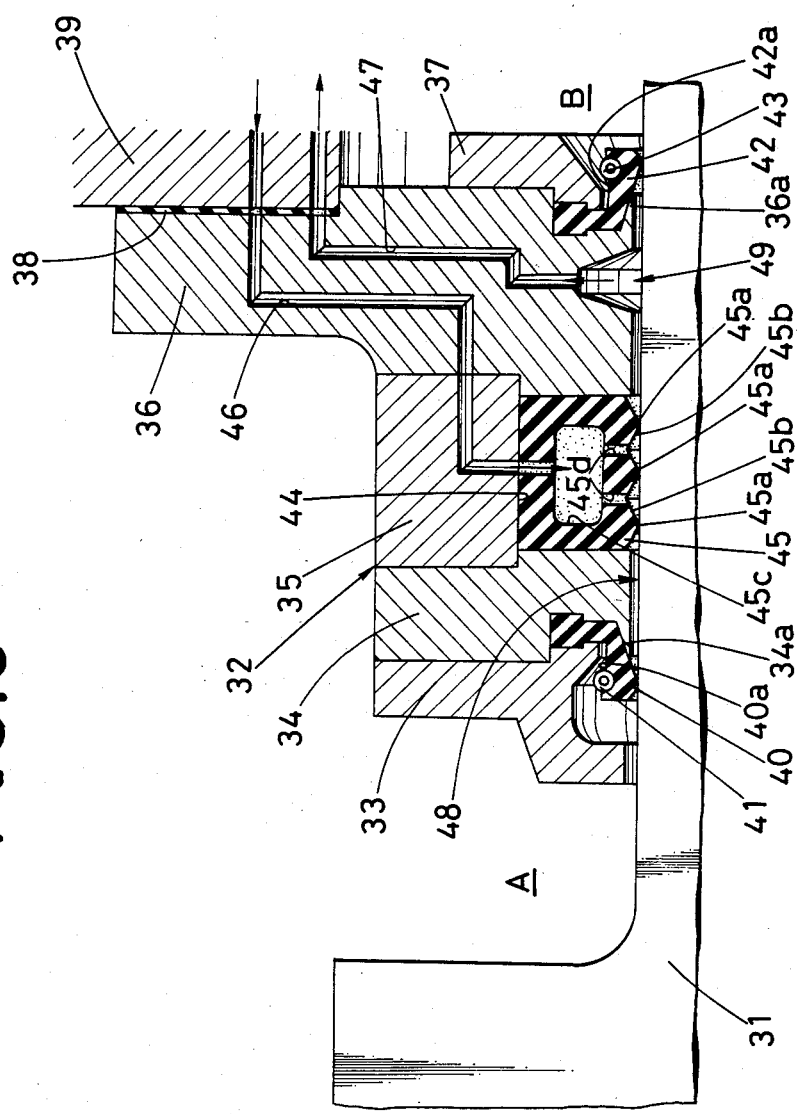
FIG. 3 is a sectional view cut taken along a diametrical cutting plane of a stern tube seal device in accordance with a third embodiment.

Next, a third embodiment will be described with reference to FIG. 3.

In this figure, reference numeral 31 designates a shaft (including a sleeve slipped externally on the shaft) to the left-hand of which is mounted a screw (not shown). A case member 32 comprising first to fifth members 33, 34, 35, 36 and 37 is arranged in the outer periphery of the shaft 31 and fixed to a ship body 39 through a packing 38. Reference numeral 40 designates an outer lip seal which is located in the inner periphery of an opening in the case member 32 and held between the first case member 33 and the second case member 34, the outer lip seal having a pressure receiving surface 40a, which is fitted with a fastening ring 41, arranged opposite to the A. A back-up ring portion 34a for controlling operation of the lip seal 40 is provided at the rear of the second case member 34 with respect to the lip seal 40. Reference numeral 42 designates an inner lip seal held between the fourth case member 36 and the fifth case member 37, the inner lip seal having a pressure receiving surface 42a, which is fitted with a fastening ring 43, directed towards lubricating oil B which is opposite to the outer lip seal 40. A back-up ring portion 36a with respect to the lip seal 42 is provided in the inner periphery of the fourth case member 36. The inside diameter of the third case member 35 which forms part of the case member 32, is made greater than that of other four members 33, 34, 36 and 37, particularly the second and fourth case members 34 and 36, and an annular recess portion 44 is formed in the inner periphery of the third case member 35. Reference numeral 45 designates a pressure type hollow ring made of rubber fitted into the annular recess portion 44, the hollow ring having a plurality (three shown in the figure) of annular crest portions 45a continuously provided in the inner peripheral surface thereof, the crest portions 45a serving as a seal portion in contact with the shaft 31, and having the required number (two shown in the figure) of fine holes 45d bored to provide communication between a trough portion 45b, between the crest portions 45a, and a hollow portion 45c. Reference numeral 46 designates a pressure fluid feed line leading from the ship body side towards the hollow portion 45c of the pressure hollow ring 45 to feed pressure fluid into the hollow portion 45c from a fluid inlet device (not shown) disposed within the ship. Reference numeral 47 designates a leaked liquid recovery line formed separately from the pressure fluid feed line 46, which recovery line is open to a space between the pressure type hollow ring 45 and the inner lip seal 42 to recover leaked liquid entering the space into the ship by means of a pump or the like (not shown).

Figure 4:
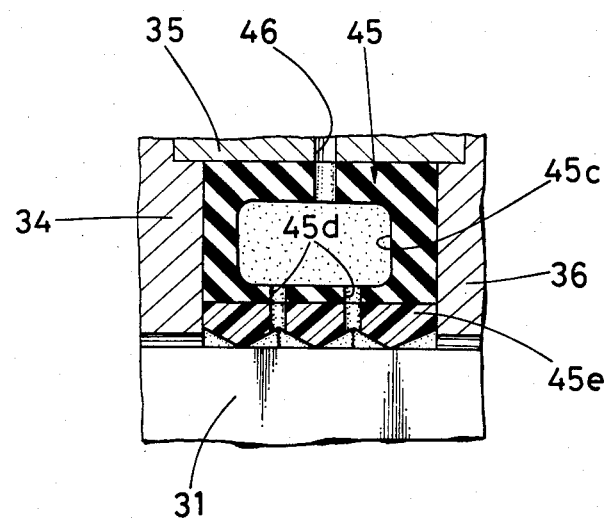
FIG. 4 is a sectional view showing an essential part of a stern tube seal device in accordance with a fourth embodiment.

In the stern tube seal device constructed as described above, when pressure fluid is fed into the hollow portion 45c of the pressure type hollow ring 45 from the pressure fluid feed line 46, the pressure fluid fills the hollow portion 45c, passes through the fine holes 45d and fills the space of triangular section surrounded by the inclined surfaces of the adjacent two crest portions 45a and the peripheral surface of the shaft 31, whereby the pressure is balanced by the space and the hollow portion 45c to bring the pressure type hollow ring 45 into contact with the shaft 31 under the conditions of low load. When pressure fluid is further fed, the pressure fluid breaks the seal portion between the pressure type hollow ring 45 and the shaft 31 and flows into the spaces 48 and 49. Pressure fluid passing into the space 48 between the outer lip seal 40 and the pressure type hollow ring 45 is stored in the space 48 to act as back pressure with respect to the outer lip seal 81, thus lowering the sliding load between the lip seal 40 and the peripheral surface of the shaft 31 and preventing entry of sea water A. In this case, it is considered that the pressure fluid might spread the lip seal 40 and flow outside the ship depending on the pressure, and therefore, it is desirable to select and use pressure fluid which poses no problem in terms of contamination of the sea, for example, such as compressed air. On the other hand, pressure fluid passing into the space 49 between the internal lip seal 42 and the pressure type hollow ring 45 is recovered into the ship from the leaked liquid recovery line 47 together with lubricating oil B leaked out of the internal lip seal 42, if any. In this manner, the pressure type hollow ring 45 is able to sufficiently perform a function as a secondary seal with respect to the lip seals 40 and 42 as far as pressure fluid is being fed. Even if feeding of pressure fluid is stopped for some reason, the hollow ring functions as a secondary seal of a limited leaking type to maintain the sealing effect to some extent in cooperation with the function of the leaked liquid recovery line 47. Accordingly, in accordance with the seal device constructed as described above, the external lip seal 40 is pressed at the rear surface by the pressure fluid to lower the sliding load between the lip seal 40 and the peripheral surface of the shaft 31 to enhance the durability of the lip seal 40, which has been heretofore worn materially, to positively seal both the sea water A and the lubricating oil B and to recover the lubricating oil B into the ship through the leaked liquid recovery line 47, thus removing a fear of contamination of the sea. Next, FIG. 4 shows an essential part of a fourth embodiment. That is, the inner peripheral portion 45e of the pressure type hollow ring 45 is formed of synthetic rubber or fluororesin which is excellent in wear resistance to enhance the wear properties.

In the stern tube seal device of the present invention, generally, the durability of a lip seal which has been heretofore used as a seal member is enhanced, a floating ring seal and a pressure type hollow ring are also used in addition to the lip seal, and the pressure of a pressure fluid is utilized, as described above. Therefore, the present invention has excellent seal performance with respect to both sea water and lubricating oil, contamination of the sea is prevented, and foreign matter such as slurry accumulated in the vicinity of a seal portion caused by the flow of pressure fluid can be removed to prevent damages due to external factors.

While the preferred embodiments of the present invention have been described, it will be apparent that the present invention can be variously modified without departing the principle thereof. It is therefore desired that all the modifications, by which the effects of the present invention are obtained substantially through the use of substantially identical or corresponding structures, are included in the category of the present invention by the appended claims.

What is claimed is:

1. A stern tube seal device for providing a seal about a rotatable shaft, comprising an annular casing means disposed about the outer periphery of a rotatable shaft, a pair of spaced lip seal means mounted in said casing means and engaging said shaft, said casing means having a recess intermediate said pair of spaced lip seal means, a resilient ring seal means disposed in said recess, and pressure fluid feed line means feeding pressure fluid to said ring seal means, said ring seal means comprising a resilient ring member having a hollow interior, said pressure fluid feed line means feeding pressure fluid to said hollow interior, said ring member having generally V-shaped portions juxtaposed to said shaft and forming troughs therebetween, said ring member having passages for passing said pressure fluid from said hollow interior to said troughs.

2. A stern tube seal device according to claim 1, wherein said resilient ring member is made of rubber.

3. A stern tube seal device for providing a seal about a rotatable shaft, comprising an annular casing means disposed about the outer periphery of a rotatable shaft, a pair of spaced lip seal means mounted in said casing means and engaging said shaft, said casing means having a recess intermediate said pair of spaced lip seal means, a resilient ring seal means disposed in said recess, and pressure fluid feed line means feeding pressure fluid to said ring seal means, said ring seal means comprising a resilient ring member having a hollow interior, said resilient ring member having an inner peripheral portion made of a wear-resistant material.

4. A stern tube seal device according to claim 3, wherein said wear-resistant material is fluoro-resin.

5. A stern tube seal for providing a seal about a rotatable shaft which extends from the stern tube of a ship comprising an annular casing means disposed about the outer periphery of a rotatable shaft, said casing having a recess extending about said shaft, a resilient ring member disposed in said recess, said ring member having a hollow interior space, a first conduit means in said casing means for receiving fluid under pressure from the interior of said ship, said first conduit means communicating with said hollow interior space, said ring member having at least one generally V-shaped portion juxtaposed to said shaft and forming a trough, said ring member having a passage for passing said pressure fluid from said hollow interior to said trough, a first and second seal means mounted on said casing means on opposite sides of said recess, a second conduit means in said casing means for recovering and returning said fluid to said ship, said second conduit means having an inlet opening in said casing means between said recess and said first seal means, said second seal means having an engaging portion engaging said shaft and a sloping portion extending from said engaging portion, said sloping portion sloping radially outwardly as said recess is approached such that fluid under pressure from said first conduit means communicates with said second seal means via said outer clearance space, said passage means and said inner clearance space acting on said sloping portion of said second seal means to reduce the pressure with which said engaging portion of said second seal means engages said shaft to thereby reduce the sliding load between said second seal means and said shaft.

6. A stern tube seal according to claim 5 further comprising a fastening ring fastening said second seal means about said shaft.

7. A stern tube seal according to claim 5, wherein said sloping portion of said second seal means comprises a frusto-conical surface, one end of said frusto-conical surface being defined by a first circular end and the other end being defined by a second circular end, said first circular end being of a larger diameter than said second circular end, said first circular end being disposed closer to said recess than said second circular end, said second circular end having a diameter substantially equal to the diameter of said shaft.

8. A stern tube seal according to claim 7, wherein said frusto-conical surface is a pressure surface exposed to the pressure of said fluid, whereby the pressure of the fluid acting on said pressure surface has a radially outwardly directed force component which reduces the load between said second seal means and said shaft.

* * * * *